UNITED STATES PATENT OFFICE.

RICHARD GLEY, OF BERLIN, GERMANY, ASSIGNOR TO ACTIEN GESELLSCHAFT FÜR ANILIN FABRIKATION, OF BERLIN, GERMANY.

ORANGE-YELLOW SULFUR DYE AND PROCESS OF MAKING SAME.

No. 813,643.　　　Specification of Letters Patent.　　　Patented Feb. 27, 1906.

Application filed July 1, 1905. Serial No. 268,014.

*To all whom it may concern:*

Be it known that I, RICHARD GLEY, of S. O. 36 Lohmuhlenstrasse 67, Berlin, in the Kingdom of Prussia, German Empire, have invented new and useful Improvements in the Production of Orange-Yellow Sulfur Dye and Process of Making Same; and I do hereby declare that the following is a full, clear, and exact description of the invention, which will enable others skilled in the art to which it appertains to make and use the same.

My present invention relates to the manufacture of yellow to orange-yellow sulfurized dyestuffs and is based on the observation that a mixture of diformyl-meta-toluylenediamin and para-phenylenediamin when heated together with sulfur to higher temperatures yields very valuable dyestuffs dyeing unmordanted cotton clear shades which are distinguished by their great fastness. This result is the more surprising, as by heating para-phenylenediamin alone with sulfur one obtains a dyestuff dyeing unmordanted cotton greenish-black shades, (compare German Patent No. 85,330.) Furthermore, the German Patent No. 146,917 would suggest the opinion that a mixture as used with my present invention would not be a suitable starting product for the production of yellow sulfurized dyestuffs, because in this patent there is used meta-toluylenediamin (in combination with diformyl-meta-toluylenediamin)—that is to say, a substance which contains a methyl group, whereas para-phenylenediamin contains no methyl group and whereas it was the general opinion that such a methyl group would be an essential feature for the formation of such sulfur dyestuffs as the present invention relates to.

In carrying out my present invention I proceed as follows, the parts being by weight: forty parts of sulfur, 6.4 parts of para-phenylenediamin, and nine parts of diformyl-meta-toluylenediamin, this being obtained by the action of formic acid on meta-toluylenediamin, are melted together. Then the temperature is gradually raised to 250° and this temperature maintained till the evolution of sulfureted hydrogen has totally ceased. The melt after cooling is finely pulverized or ground. There results thereby a brown-red powder, insoluble in water and alcohol, soluble in soda-lye with a yellow coloration, which solution is precipitated by the addition of hydrochloric acid in yellow-brown flakes.

The dyestuff dissolves in sodium sulfid with a yellow coloration and dyes from such a solution, especially when added with common salt, unmordanted cotton clear orange-yellow shades, showing a full sight "overhand" and a great fastness to washing and milling.

It is obvious to those skilled in the art that I am not limited to the above example nor to the details given therein, and many variations may be made with the process as defined in the foregoing example without departing from the scope of my invention. Thus, for instance, I state that a somewhat higher temperature at which the melt is effected will yield a product dyeing more reddish tints, whereas heating to a temperature lower than that mentioned in the example gives a product dyeing more yellowish tints. Furthermore, the proportions of the ingredients may also be varied within good limits without essentially changing the result.

Now what I claim is—

1. The manufacture of a new sulfurized dyestuff by heating a mixture of diformyl-meta-toluylenediamin and para-phenylenediamin with sulfur to above 200° centigrade.

2. The new sulfurized dyestuff obtained by the action of sulfur on a mixture of diformyl-meta-toluylenediamin and para-phenylenediamin, being, when well pulverized or ground, a brown-red powder, insoluble in water and alcohol, soluble in soda-lye with a yellow color, which solution by the addition of hydrochloric acid separates yellow-brown flakes, soluble in sodium sulfid with a yellow color, dyeing from a bath containing sodium sulfid and common salt clear orange-yellow shades of great fastness to washing and milling.

In witness whereof I have hereunto signed my name, this 17th day of June, 1905, in the presence of two subscribing witnesses.

RICHARD GLEY.

Witnesses:
HENRY HASPER,
GUSTAV LUCHT.